United States Patent [19]
Montague et al.

[11] Patent Number: 6,036,542
[45] Date of Patent: Mar. 14, 2000

[54] SADDLE ASSEMBLY FOR A CIRCUIT BREAKER

[75] Inventors: Wade A. Montague, Southington; David A. Reid, Forestville; J. Peter McCuin, Bristol; Dennis J. Doughty, Plainville; Marshall B. Hart, Middletown, all of Conn.

[73] Assignee: General Electric Company, Schenectady, N.Y.

[21] Appl. No.: 09/108,996

[22] Filed: Jul. 1, 1998

[51] Int. Cl.7 .................................................. H01R 13/40
[52] U.S. Cl. ........................... 439/595; 439/709; 439/575
[58] Field of Search .................................... 439/595, 709, 439/575, 715

[56] References Cited

U.S. PATENT DOCUMENTS

| | | | |
|---|---|---|---|
| 3,594,712 | 7/1971 | Eright et al. | 439/709 |
| 4,029,385 | 6/1977 | Mysiak et al. | 439/66 |
| 4,210,379 | 7/1980 | Vachlamni et al. | 439/709 |
| 4,785,378 | 11/1988 | Hinckey et al. | 439/709 |
| 5,744,768 | 4/1998 | Bishopn et al. | 200/50.1 |

*Primary Examiner*—Steven L. Stephan
*Assistant Examiner*—J. F. Duverne
*Attorney, Agent, or Firm*—Carmody & Torrance LLP; Carl B. Horton

[57] ABSTRACT

A saddle assembly (10) for a circuit breaker comprising a saddle base (22), at least one stab terminal (14) and two resilient tabs (50, 52) in facing alignment for releasably securing the at least one stab terminal (14) to the saddle base (22), wherein the engagement of the two resilient tabs (50, 52) with the stab terminal (14) releasably secures the at least one stab terminal (14) to the saddle base (22).

10 Claims, 6 Drawing Sheets

SADDLE ASSEMBLY FOR A CIRCUIT BREAKER

BACKGROUND OF THE INVENTION

The present invention relates to a saddle assembly for a circuit breaker assembly, and in particular, to an improved saddle base construction for a saddle assembly which facilitates the releasable securing of stab terminals therein.

Saddle assemblies for circuit breaker assemblies are known. In one embodiment utilized by the assignee of the present invention, the stab terminals are mounted on and secured to the saddle base by one or more screws. In particular, the known stab terminals typically will include an aperture in a section thereof through which the screw engages the saddle base thereby ensuring an adequate securing of the stab terminal to the saddle base. However, the known construction is less than desirable for the reason that the necessity of the screw to mount the stab terminals to the saddle base adds additional components to the assembly thereby resulting in a more expensive assembly construction.

Accordingly, it is desirable to develop an improved saddle assembly that overcomes the aforementioned deficiencies. In particular, by constructing a saddle assembly in an effective manner that eliminates the need for components such as the aforementioned screws presently necessary to secure the stab terminals to the saddle base, a minimum amount of hardware is required thereby minimizing the cost of the overall saddle assembly as well as minimizing the cost of assembling the saddle assembly. In this way, the assembly can be more economically mass produced. The saddle assembly disclosed herein achieves the aforementioned and below mentioned objectives.

SUMMARY OF THE INVENTION

Generally speaking, in accordance with the invention, a saddle assembly for a circuit breaker assembly is provided. In the preferred embodiment, the saddle assembly comprises a saddle base, at least one stab terminal, at least one lug, and two resilient tabs in facing alignment for releasably securing the at least one stab terminal to the saddle base, wherein the engagement of the two resilient tabs with the stab terminal releasably secures the at least one stab terminal to the saddle base.

Accordingly, it is an object of the present invention to provide an improved saddle base for a saddle assembly.

It is another object of the present invention to provide an improved saddle assembly that can be more economically produced.

It is yet another object of the present invention to provide a saddle assembly that can be more easily assembled.

Still other objects and advantages of the invention will in part be obvious and will in part be apparent from the specification.

The invention accordingly comprises the features of construction, combination of elements and arrangement of parts which will be exemplified in the construction hereinafter set forth, and the scope of the invention will be indicated in the claims.

DETAILED DESCRIPTION OF THE PREFERRED EMBODIMENT

Figure 1:
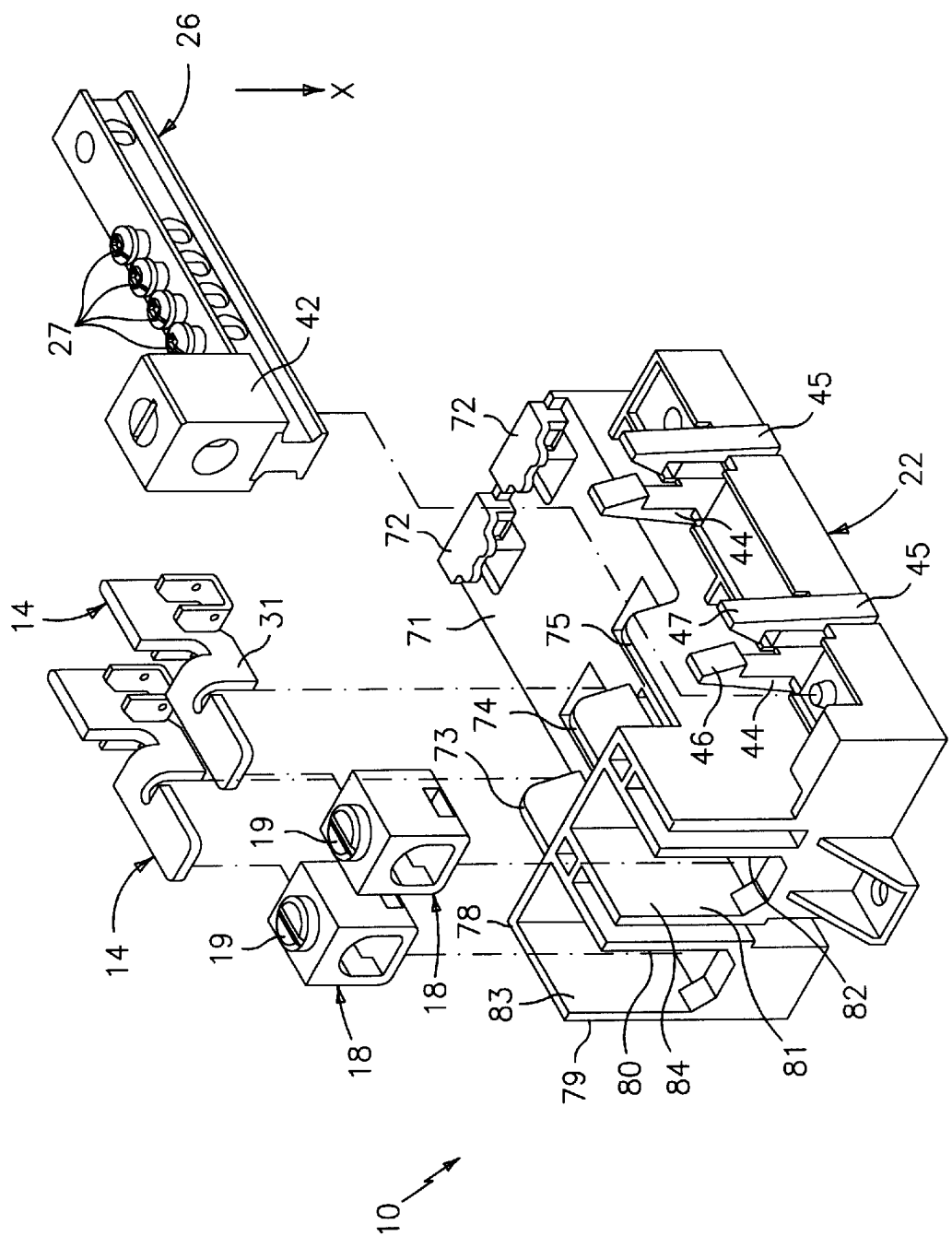
FIG. 1 is a prospective exploded view of a saddle assembly constructed in accordance with the present invention.
Figure 2:
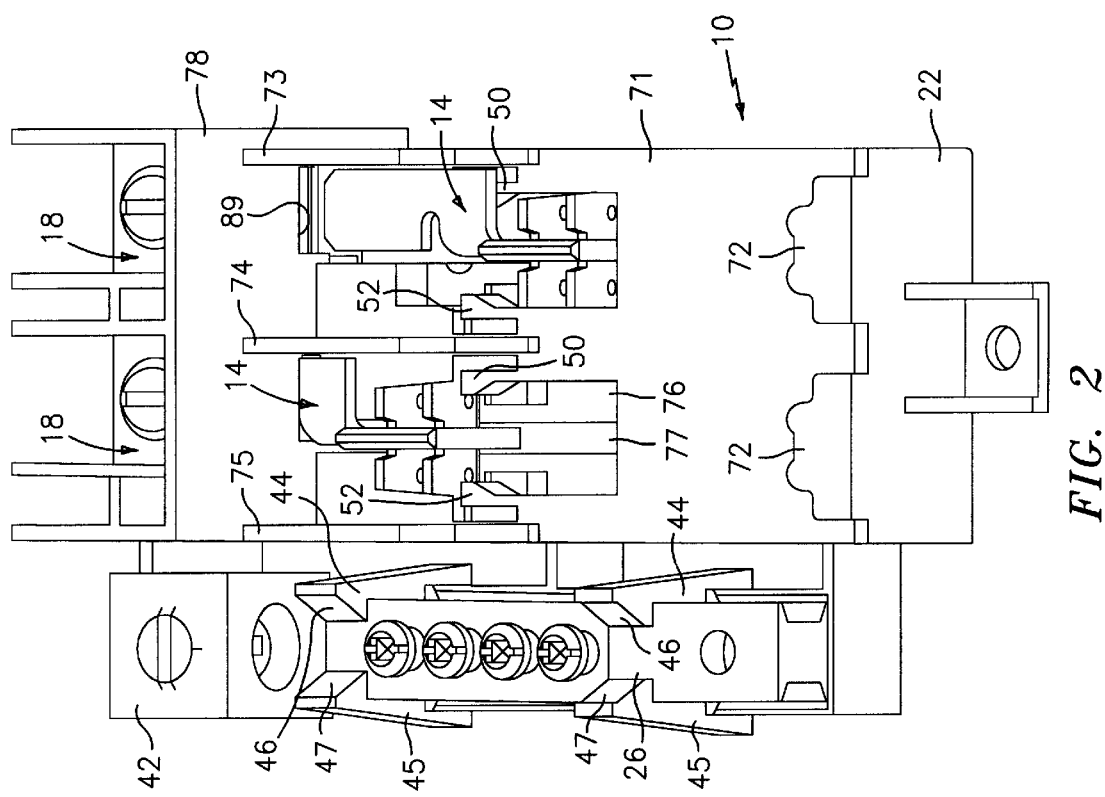
FIG. 2 is a perspective view of the saddle assembly of FIG. 1 more clearly illustrating one aspect of the present invention.

Reference is generally made to FIGS. 1 and 2 which depict a saddle assembly for a circuit breaker, generally indicated at 10, constructed in accordance with the present invention. Generally speaking, saddle assembly 10 may be a multi-pole load center having the capability to engage a plurality of circuit breakers. The presently disclosed example depicts a load center adapted to receive either two single pole breakers, one two-pole circuit breaker or four single-pole circuit breakers. Accordingly, references herein may occasionally be made generally to only one of the saddle terminal arrangements but it should be understood that both of the saddle terminal arrangements will be identically constructed. Moreover, additional larger load centers can be constructed while remaining within the scope of the invention.

Assembly 10 preferably includes at least one stab terminal 14 (the exemplary embodiment depicts two stab terminals as explained above), at least one lug 18 (similarly, the exemplary saddle assembly depicts two lugs) and a saddle base 22 which is constructed to support at least one circuit breaker (not shown) mountable thereon. Saddle assembly 10 also may include a neutral bus bar 26 which is mounted on saddle base 22 as discussed below, the function of which would be well understood in the art.

Figure 3:
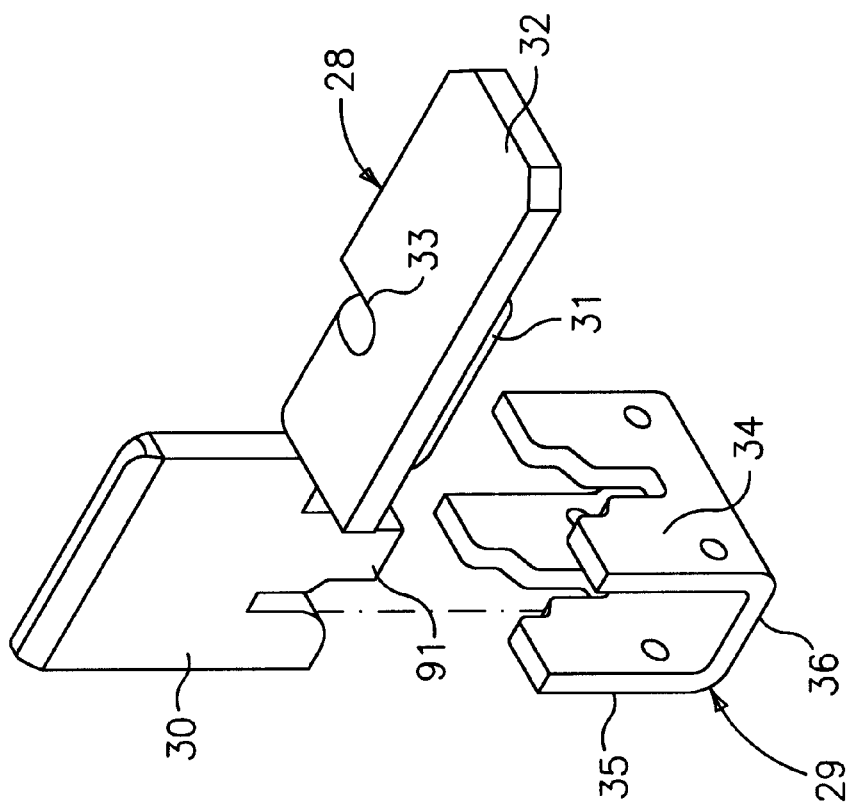
FIG. 3 is a prospective view of a stab terminal construction including a body and a "U"-shaped member constructed in accordance with the present invention.

Reference is now also made to FIG. 3 for a more detailed disclosure of the preferred construction of stab terminal 14. In particular, stab terminal 14 is preferably of a two piece copper construction comprising a body, generally indicated at 28, and a "U"-shaped member 29. Body 28 includes a vertically oriented stab portion 30, a vertically oriented base portion 31 integrally formed therewith and a tongue portion 32 orthogonally and integrally formed therewith. Stab portion 30 may itself include a center leg 91 and an elongated opening on each side thereof for receiving "U"-shaped member 29 as discussed below. Tongue portion 32 includes a U-shaped opening 33 defining an edge 92 on base portion 31. U-shaped member 29 includes a front side wall 34, a rear sidewall 35 and a base 36. U-shaped member 29 is preferably inserted into the elongated openings adjacent foot 91 and riveted to foot 91 of stab portion 30 in a well known manner.

Each lug 18 is of a unitary aluminum construction having a threaded aperture for receiving a threaded screw 19. A U-shaped aperture 17, orthogonal to the aforementioned threaded aperture, extends orthogonally through lug 18. Neutral bus bar 26 is also of an aluminum construction and is comprised of a plurality of terminals 27 for receiving a plurality of wire connections. A neutral lug 42 constructed similar to lug 18, is provided for the coupling of the neutral wires.

Reference is now made to a more detailed description of saddle base 22. In particular, saddle base 22 is preferably formed of a molded plastic. Saddle base 22 includes a top surface 71 which supports a portion of the circuit breaker that would be mounted thereon, at least one rear support tab 72 for securing the circuit breaker from the rear end thereof, and a plurality of integrally molded rib walls 73, 74, 75 for electrical clearances for the mounted circuit breakers. A trough 76 is provided for each stab terminal 14, each trough including a still further deepened track 77 which is provided for receiving the bottom edge of base portion 31 of stab terminal 14. Extending orthoganily to rib walls 73, 74, 75 is an integrally formed wall 78. Wall 78 includes an apertured slot 89. A plurality of orthoganily formed lug enclosing walls 79, 80, 81, 82, integrally formed with wall 78, respectively form two enclosures 83, 84 for receiving, enclosing and securing lugs 18. At the front end of saddle 22 is a plurality of corners 85, 86, 87, 88 integrally molded with saddle base 22. Corners 85–88 assist in securing the respective lugs within enclosures 83, 84, as will be discussed below.

Saddle base 22 also includes at least two pairs of facing fingers 44, 45. Facing fingers 44, 45 each respectively include finger tips 46, 47 for securing neutral bus bar 26 therebetween. Facing fingers 44, 45 are integrally molded with saddle base 22 and resiliently formed, so as to receive neutral bus bar 26 and permit the releasable engagement of neutral bus bar 26 therebetween.

Saddle base 22 also includes a plurality of integrally molded and flexible tabs 50 and 52 (the exemplary embodiment depicts two pairs of tabs 50, 52). Tabs 50 and 52 comprise an arm portion 54 and an inwardly angled hand portion 56 extending therefrom. Comprising the inwardly angled hand portion 56 of each tab 50 or 52 is at least an inwardly angled surface 57, an inwardly facing side surface 58, and a front surface 59. Tabs 50 and 52 are flexibly formed so as to permit the engagement of and releasable securing of each stab terminal 14 to saddle base 22.

Figure 4:
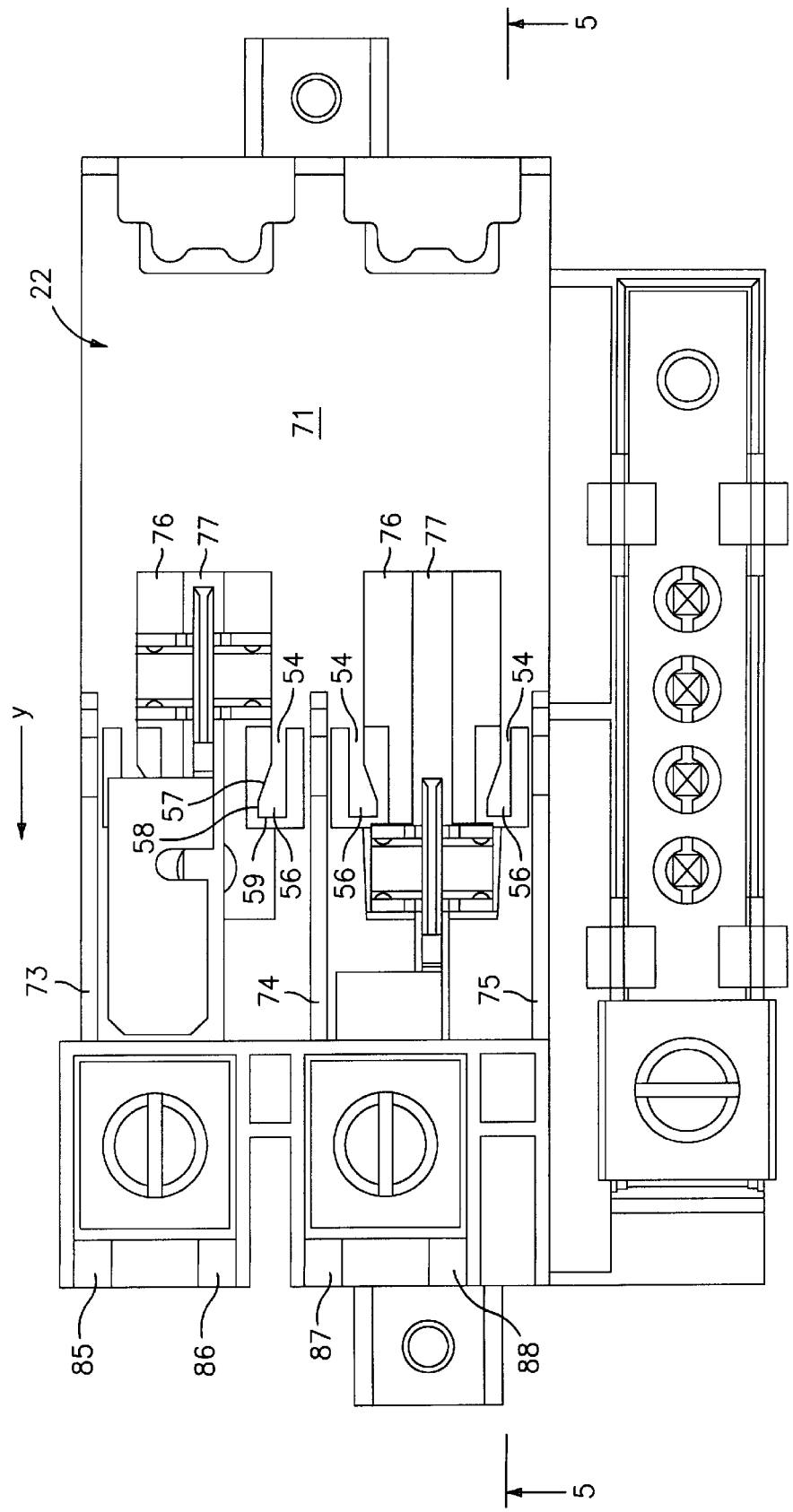
FIG. 4 is a top plan view of a saddle assembly constructed in accordance with the present invention illustrating one stab terminal prior to its being secured to a saddle base and another stab terminal which is secured to the saddle base.
Figure 5:
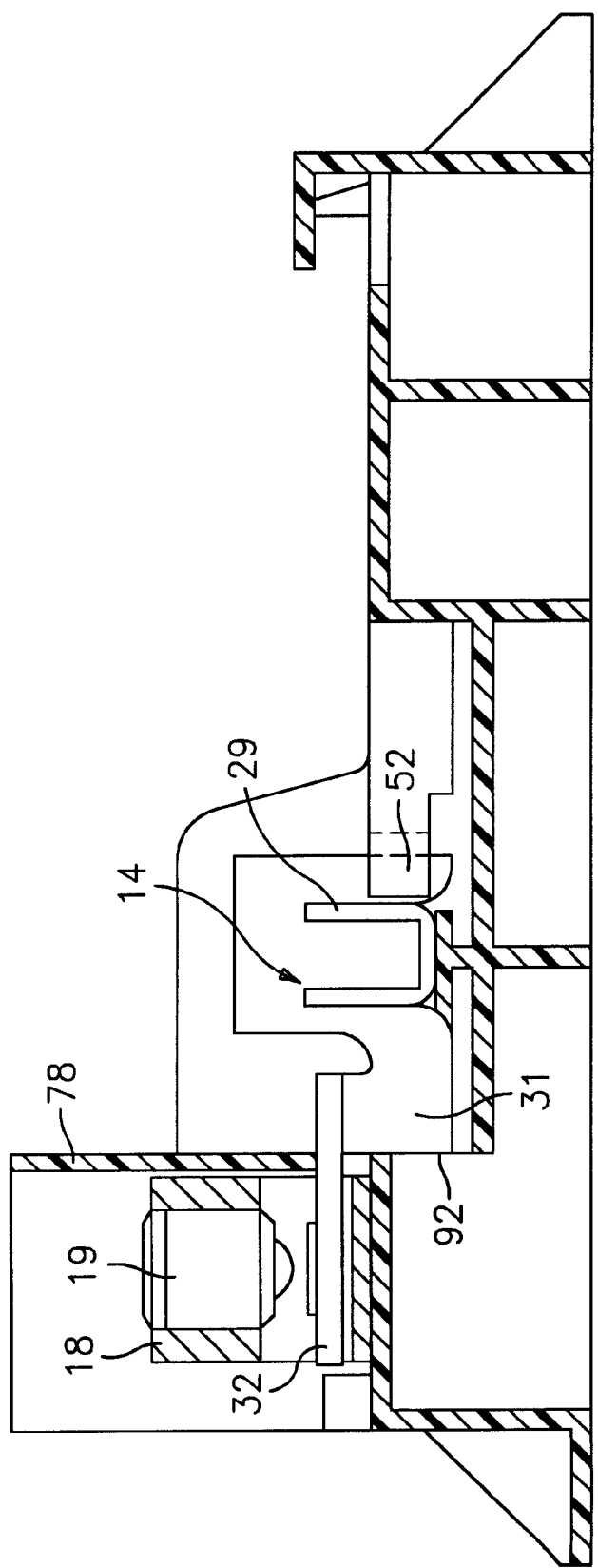
FIG. 5 is a cross sectional view taken along lines 5—5 of FIG. 4.
Figure 6:
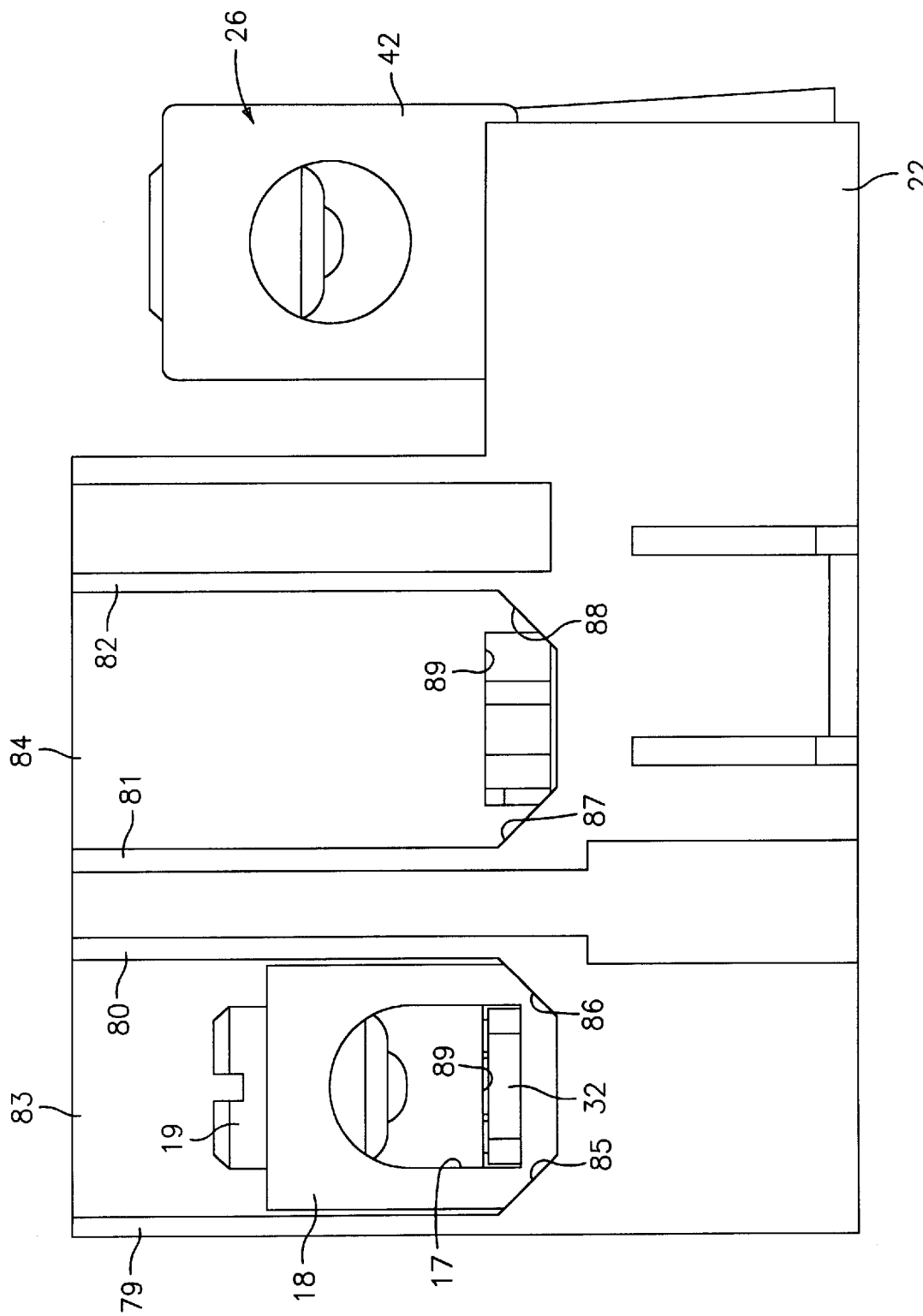
FIG. 6 is a front elevational view of the saddle assembly depicted in FIG. 4 with one lug removed.

With a detailed description of the construction of the saddle assembly completed, reference will now be made to the manner in which the assembly is preferably assembled, the order thereof comprising no part of the invention. As briefly discussed above, neutral bus bar 26 is positioned between the plurality of pairs of fingers 44, 45 by moving the neutral bus bar in a downwardly direction as indicated by the dotted line and arrow "x" in FIG. 1. Similarly, lugs 18 are disposed within the respective enclosures 83 and 84. It should now become apparent that walls 79, 80 and corners 85 and 86 cooperatively prevent lug 18 from escaping enclosure 83. Corners 87 and 88 and walls 82 and 81 likewise cooperatively prevent the other illustrated lug from escaping enclosure 84. Each of the stab terminals 14 may then be inserted into the saddle base 22 again, the process being the same for each required terminal 14. Specifically, stab terminal 14 is also moved in the downwardly "x" direction as depicted in FIG. 1. It can be now be appreciated that the length of each trough 76 is dimensioned to receiving the full length of stab terminal 14, with the bottom edge of base portion 31 being asserted into track 77. Stab terminal 14 is then moved in the "y" direction (FIG. 4) so as to permit tongue 32 to be inserted within slot 89 of wall 78. As base portion 31 of stab terminal 14 slides within track 77 in the "y" direction, the front surface of side wall 34 of "U"-shaped portion 29 will engage the inwardly angled surface 57 of each tab 50 and 52. The resilient nature of tabs 50 and 52 permit the further sliding motion of stab terminal 14 therebetween and along side surface 58 of each tab 50, 52. At substantially the moment at which the back surface of wall 35 clears each surface 58 of tabs 50 and 52, tabs 50 and 52 resiliently spring back so as to releasably secure stab terminal 14 within trough 76, and in particular, by way of the engagement of surfaces 59 and wall 35 of each stab terminal. At this point, edge 92 of base portion 31 also will contact wall 78 to prevent any further substantial movement of stab terminal 14 (FIG. 5). Slot 89 retains tongue 32 therein. Therefore, the entire stab terminal 14 is secured to and within saddle base 22. Moreover, as tongue 32 enters slot 89, the bottom surface of tongue 32 will engage and secure lug 18 within enclosure 83 (FIG. 6). A somewhat moderately forceful pulling on terminal 14 in a direction opposite to direction "y" should cause the removal of terminal 14 from saddle base 22.

It can thus be seen that the combination of the resiliently formed tabs 50 and 52 and slot 89 more than adequately retains stab terminal 14 within saddle base 22 until removal is desired. Likewise, by virtue of the adequate retention of stab terminal 14 within saddle base 22, lugs 18 are also more than adequately retained within their respective enclosure 83 or 84.

With saddle assembly 10 now complete, circuit breaker(s) (not shown) can be disposed on, and mechanically and electrically connected thereto.

It will thus be seen that the present invention achieves a novel and improved saddle assembly which eliminates the necessity of additional components such as screws to retain stab terminal 14 to saddle base 22. That is, by virtue of the resilient tabs and slots formed within the saddle base walls, an improved, more cost effective, and more easily manufacturable saddle assembly is achieved.

We claim:

1. A saddle assembly for receiving a circuit breaker thereon, the saddle assembly comprising:

a saddle base including a wall member having a slot defined therethrough;

at least one stab terminal having at least a tongue portion, a first wall and a second wall;

a first resilient tab and a second resilient tab in facing alignment to the first tab, each of the tabs being coupled to the saddle base and for releasably securing the at least one stab terminal to the saddle base;

wherein the stab terminal is releasably secured to the saddle base by the tongue portion being disposed through the slot and by the engagement of the first wall with the wall member and the second wall with the first and second tabs.

2. The saddle assembly as claimed in claim 1, wherein the saddle base includes a first and second saddle base wall and a first and second corner, the first and second saddle base walls and the first and second corners being integrally formed with the saddle base, wherein the first and second saddle base walls and the first and second corners forming a part of an enclosure enclosing a lug when the lug is mounted on the saddle base.

3. The saddle assembly as claimed in claim 1, wherein the saddle base includes at least one trough with a track disposed therein and the stab terminal includes a base portion, wherein the stab terminal is positioned in the trough and the base portion of the stab terminal is aligned in the track;

wherein when the stab terminal slides along the track the tongue portion enters within the slot and the first and second tabs engage and secure the stab terminal within the trough.

4. The saddle assembly as claimed in claim 3, and including a lug; wherein the lug includes a "U"-shaped aperture and the tongue portion of the stab terminal is disposed within the aperture to assist in securing the lug to the saddle base.

5. The saddle assembly as claimed in claim 4, wherein the saddle base includes a first and second saddle base wall and a first and second corner, the first and second saddle base walls and the first and second corners being integrally formed with the saddle base, wherein the first and second saddle base walls and the first and second corners forming a part of an enclosure enclosing the lug when the lug is mounted on the saddle base.

6. The saddle assembly as claimed in claim 1, and including at least a first lug and a second lug, a second stab terminal and third and fourth resilient tab in facing relation; wherein the third and fourth resilient tabs releasably secure the second stab terminal to the saddle base.

7. The saddle assembly as claimed in claim 1, wherein the first and second resilient tabs are integrally formed with the saddle base.

8. A saddle base for use in a saddle assembly that receives a circuit breaker thereon, the saddle assembly comprising at least one stab terminal having at least a tongue portion and a base portion, the saddle base comprising:

at least one trough with a track disposed therein for receiving the base portion of the stab terminal;

a first resilient tab and a second resilient tab in facing alignment with the first tab, each of the tabs being coupled to the saddle base and for releasably securing the at least one stab terminal to the saddle base;

a formed wall member having a slot defined therethrough;

wherein the stab terminal is releasably secured to the saddle base by the tongue portion being disposed through the slot and by the engagement of the base portion of the stab terminal with the wall member and the first and second tabs.

9. The saddle base as claimed in claim 8, including means for releasable securing a neutral bus bar.

10. The saddle base as claimed in claim 8, including at least one rear tab integrally formed therewith, wherein the stab terminal and the rear tab are engageable with a circuit breaker mounted on the saddle base.

* * * * *